US012322151B2

United States Patent
Yu et al.

(10) Patent No.: US 12,322,151 B2
(45) Date of Patent: Jun. 3, 2025

(54) DA-BD-LSTM-DENSE-UNet FOR LIVER LESION SEGMENTATION

(71) Applicant: THE UNIVERSITY OF HONG KONG, Hong Kong (HK)

(72) Inventors: Philip Leung Ho Yu, Hong Kong (HK); Keith Chiu, Hong Kong (HK); Man Fung Yuen, Hong Kong (HK); Wai Kay Walter Seto, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 329 days.

(21) Appl. No.: 17/916,589

(22) PCT Filed: Mar. 23, 2021

(86) PCT No.: PCT/CN2021/082361
§ 371 (c)(1),
(2) Date: Oct. 3, 2022

(87) PCT Pub. No.: WO2021/197135
PCT Pub. Date: Oct. 7, 2021

(65) Prior Publication Data
US 2023/0154141 A1    May 18, 2023

Related U.S. Application Data

(60) Provisional application No. 63/004,563, filed on Apr. 3, 2020.

(51) Int. Cl.
*G06V 10/40* (2022.01)
*G06V 10/44* (2022.01)
*G06V 10/82* (2022.01)

(52) U.S. Cl.
CPC ............ *G06V 10/454* (2022.01); *G06V 10/82* (2022.01); *G06V 2201/031* (2022.01)

(58) Field of Classification Search
CPC . G06V 10/454; G06V 10/82; G06V 2201/031
See application file for complete search history.

(56) References Cited

U.S. PATENT DOCUMENTS

| 2019/0130562 | A1* | 5/2019 | Liu | G06T 7/0012 |
| 2019/0347792 | A1 | 11/2019 | Pauly | |
| 2020/0012895 | A1* | 1/2020 | Zhao | G16H 30/40 |
| 2022/0237801 | A1* | 7/2022 | Kaufman | G06N 3/088 |
| 2022/0415059 | A1* | 12/2022 | Smolyanskiy | G06N 3/0464 |

OTHER PUBLICATIONS

Pratiher S, Chattoraj S, Agarwal S. Bhattacharya S. Grading tumor malignancy via deep bidirectional LSTM on graph manifold encoded histopathological image. In2018 IEEE International Conference on Data Mining Workshops (ICDMW) Nov. 17, 2018 (pp. 674-681). IEEE. (Year: 2018).*

(Continued)

*Primary Examiner* — Fayyaz Alam
(74) *Attorney, Agent, or Firm* — Amin, Turocy & Watson, LLP

(57) ABSTRACT

Disclosed are systems and methods using artificial intelligence for the detection and characterization of liver cancers.

24 Claims, 5 Drawing Sheets

(56) References Cited

OTHER PUBLICATIONS

Xu F, Ma H, Sun J, Wu R, Liu X, Kong Y. Lstm multi-modal unet for brain tumor segmentation. In2019 IEEE 4th international conference on image, vision and computing (ICIVC) Jul. 5, 2019(pp. 236-240). IEEE. (Year: 2019)*

International Search Report and Written Opinion for International Application No. PCT/CN2021/082361 mailed on Jun. 21, 2021, 8 pages.

* cited by examiner

DA-BD-LSTM-DENSE-UNet FOR LIVER LESION SEGMENTATION

This international patent application claims the benefit of U.S. Provisional Patent Application No. 63/004,563 filed on Apr. 3, 2020, the entire content of which is incorporated by reference for all purpose.

TECHNICAL FIELD

Disclosed are systems and methods for the detection and characterization of liver cancer using artificial intelligence.

BACKGROUND

Hepatocellular carcinoma (HCC) is the fourth leading cause of cancer death worldwide in 2018. Take Hong Kong as an example, HCC accounted for 10.3% of cancer death. Early diagnosis and detection of HCC can facilitate earlier medical treatment and improve survival. Typically, as recommended by international guidelines, patients with suspicious HCC are diagnosed radiologically by using either computed tomography (CT) or magnetic resonance (MR) scans without the use of liver biopsy. Artificial intelligence has emerged as an important technological advancement in medical diagnostics. Traditionally, slices of CT scan images are interpreted by clinicians visually and the accuracy of diagnosis heavily relies on their experience. Thus, accurate diagnosis of liver lesions can be a challenging task, and if serial scans are required, there can be a significant time lag till diagnosis, potentially delaying curative treatment. Recently, researchers adopted deep-learning methods to diagnose HCC using multi-phase CT images. Sun et al. [6] designed a multi-channel fully convolutional network to segment tumors from multi-phase contrast-enhanced CT images, of which one network for each phase of CT images was trained and high-level features of multi-phase images were fused for tumor segmentation. Todoroki et al. [7] adopted deep convolutional neural networks for liver tumor classification based on liver segmentation [12, 13], of which contrast-enhanced multi-phase CT images of hepatic tumors were investigated. Lee et al. [9] proposed an optimized version of single shot multibox detector (SSD) [14], which grouped convolutions for multi-phase features and leveraged information of multi-phase CT images. Liang et al. [11] classify multi-phase CT images of focal liver lesions by combining convolutional networks and recurrent networks. Ouhmichi et al. [8] proposed a cascaded convolutional neural network based on U-Net and designed two strategies to fuse multi-phase information: 1) concatenating in a multi dimensional feature maps on input layer, and 2) output maps were computed independently for each phase before being merged to produce the final segmentation.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

Although the above works had achieved satisfactory performance, the above works did not consider relationships between the encoded features in the encoding path and the upsampled features in the decoding path. Besides, these methods tended to rely on an additional object detection model to localize tumor position for a reliable segmentation. To address these issues, the disclosure herein proposes an enhanced segmentation model that combines DenseUNet and bidirectional long short term memory together with two attention mechanisms into these modules, referred to as DA-BDLSTM-DenseUNet. The advantages of this model are as follows:

DenseUNet is capable of learning enough diverse informative features and enrich the expressive capability of networks by regulating the information flow over the network;

Bidirectional LSTM explores relationships between the encoded features and the upsampled features, and provides a new strategy of feature fusion more than feature concatenation;

The attention gate in DenseUNet restrains response of feature maps corresponding to unrelated background regions and highlights response of salient lesion regions progressively; and The attention mechanism in BDLSTM takes into account the contribution differences of both the encoded features and the decoded features and identifies the importance of feature maps from the perspective of channels.

Provided herein is a new segmentation model by integrating DenseUNet and bidirectional LSTM together with attention mechanism, termed as DA-BDLSTM-DenseUNet. DenseUNet allows learning enough diverse features and enhancing the representative power of networks by regulating the information flow. Bi-directional LSTM is responsible to explore the relationships between the encoded features and the upsampled features in the encoding and decoding paths. Meanwhile, attention gates (AG) are introduce into DenseUNet to diminish responses of unrelated background regions and magnify responses of salient regions progressively. The attention in bidirectional LSTM takes into account the contribution differences of the encoded features and the upsampled features in segmentation improvement, which can in turn adjust proper weights for these two kinds of features. Experiments are conducted on liver CT image data sets collected from multiple hospitals by comparing with state-of-the-art segmentation models. Experimental results indicate that the proposed method DA-BDLSTM-DenseUNet achieves comparative performance in terms of dice coefficient, which demonstrates its effectiveness.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

Table 1 shows the statistical description about the number of slices over four phases for data set PYN.

Figure 2:
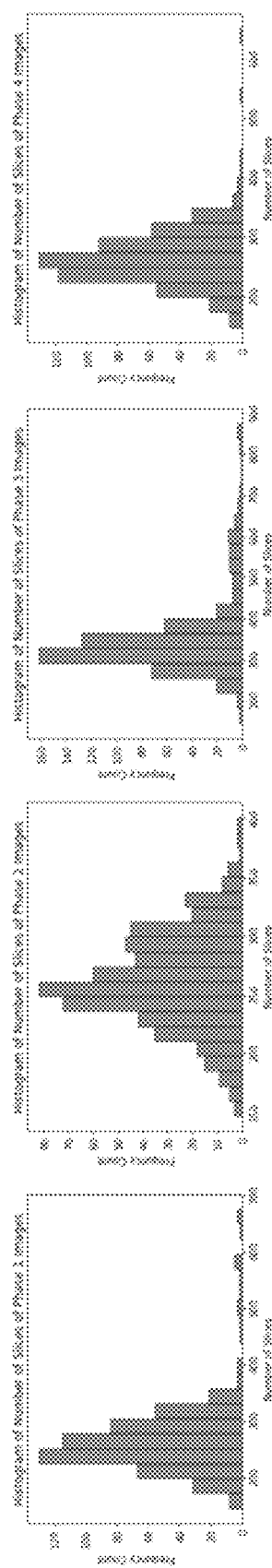

FIG. 2 illustrates the histogram of the slice numbers over four phases for data set PYN.

Table 2 shows the comparison results obtained by competing methods and DA-BDLSTM-DenseUNet on data set LiTS and PYN in terms of DC.

Table 3 reports the results of ablation study by removing the attention mechanism module in the method described herein on data LiTS and PYN in terms of DC in accordance with one embodiment.

FIGS. 3(a), 3(b), 3(c), and 3(d) illustrate the overview architecture of the herein described DA-BDLSTM-Dense-UNet in accordance with one embodiment.

Figure 4:
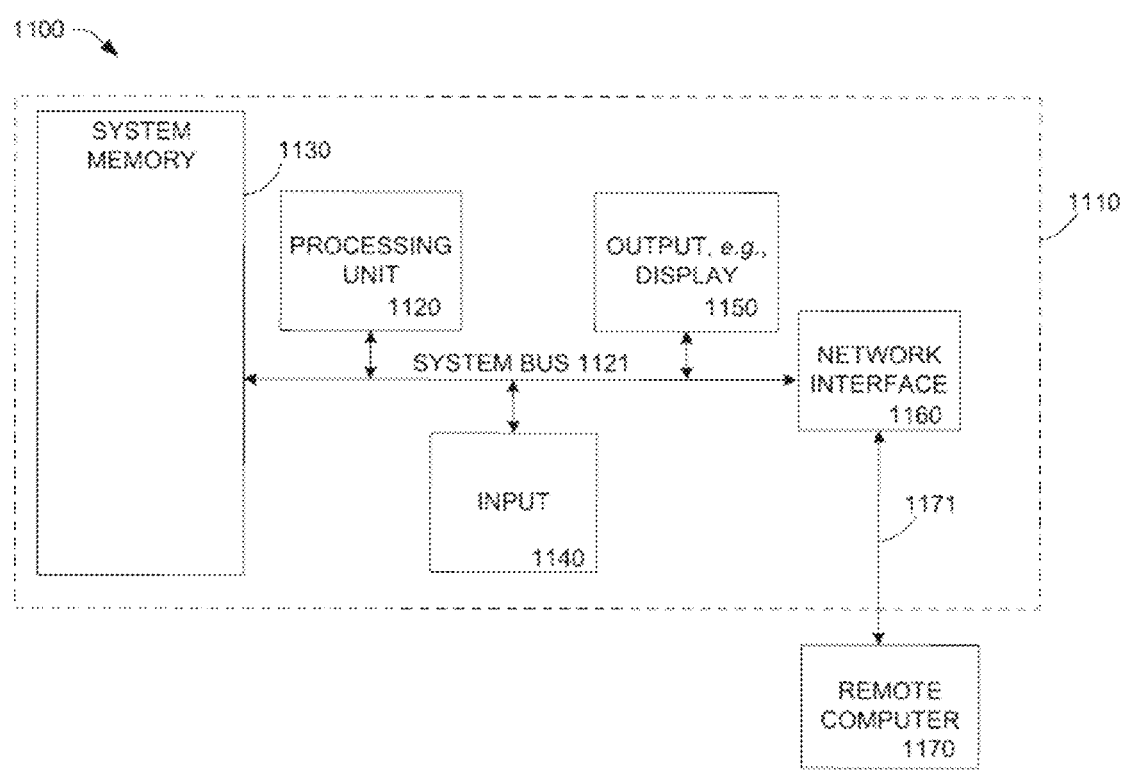

FIG. 4 illustrates a block diagram of an example electronic computing environment that can be implemented in conjunction with one or more aspects described herein.

Figure 5:
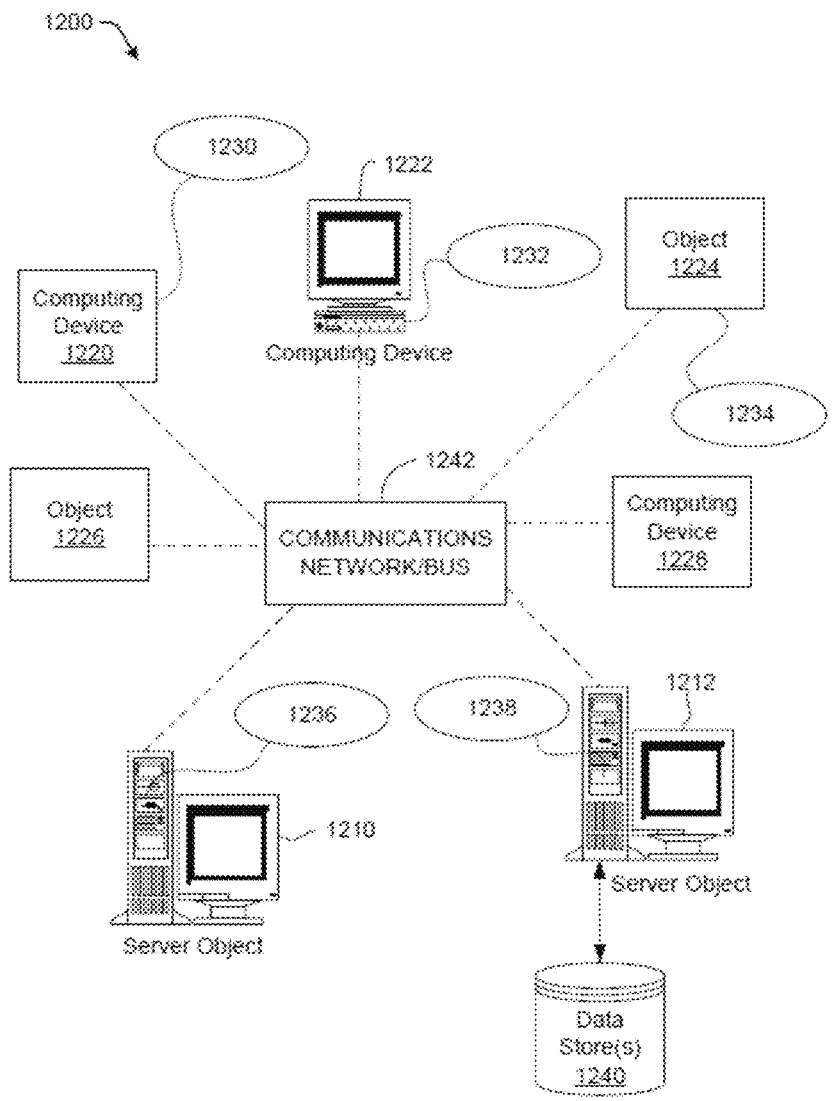

FIG. 5 depicts a block diagram of an example data communication network that can be operable in conjunction with various aspects described herein.

DETAILED DESCRIPTION

Disclosed herein are methods and systems for achieving automatic lesion detection and identification for liver cross-sectional medical imaging, which provide a more efficient diagnosis and reduces the randomness related to clinicians' experience and judgment. Meanwhile, the methods and systems allow an earlier targeted medical treatment, thereby improving the survival of liver cancer. The methods and systems involve fusing DenseUNet and BD-LSTM into a unified framework, where two attention mechanisms are introduced. Thus, it enjoys advantages of UNet, densely connected convolutional network and BD-LSTM in capturing salient feature responses of region candidates of corresponding to liver lesions. On the other hand, the attentions accentuate the feature responses in the pixelwise and feature-map levels, which are response of lesion detection and identification. As a result, the segmentation performance of liver lesion is improved.

Some limitations in the art include 1) the availability of adequate liver cross-sectional images and corresponding segmentation annotations for lesions, 2) the domain divergence between liver cross-sectional images from different hospitals, and 3) the requirement of hardware resources. The methods and systems overcome the above limitations by 1) collecting and annotating liver cross-sectional images with lesions; 2) adopting domain adaptation to learn transferable knowledge; and 3) exploring new network architectures to reduce the hardware requirement by neural architecture searching.

Since images with manual segmentation annotation are the foundation that the herein method works, more images from hospitals are collected and annotated. In addition, available public annotated images can complement that data when training the model. Secondly, domain adaptation is utilized to transfer the knowledge learnt from one image data set as source domain to another one as the target domain, in which the domain gap or the distribution divergences of lesions will be taken into account. Thirdly, inspired by the success of neural architecture searching, the feasibility of reducing the hardware requirement from the proposed methods can be explored. Thus, a reduction in the required amount of images and annotation costs as well as the diagnosis time can be achieved. Last but not least, the heat maps learnt by neural network-based classification models and construct relationships between the heap maps and the manual segmentation annotations are explored. Based on the learnt relationships, the dependence on manual segmentation annotation by merely using the label information of lesions can be bypassed.

Figure 1:
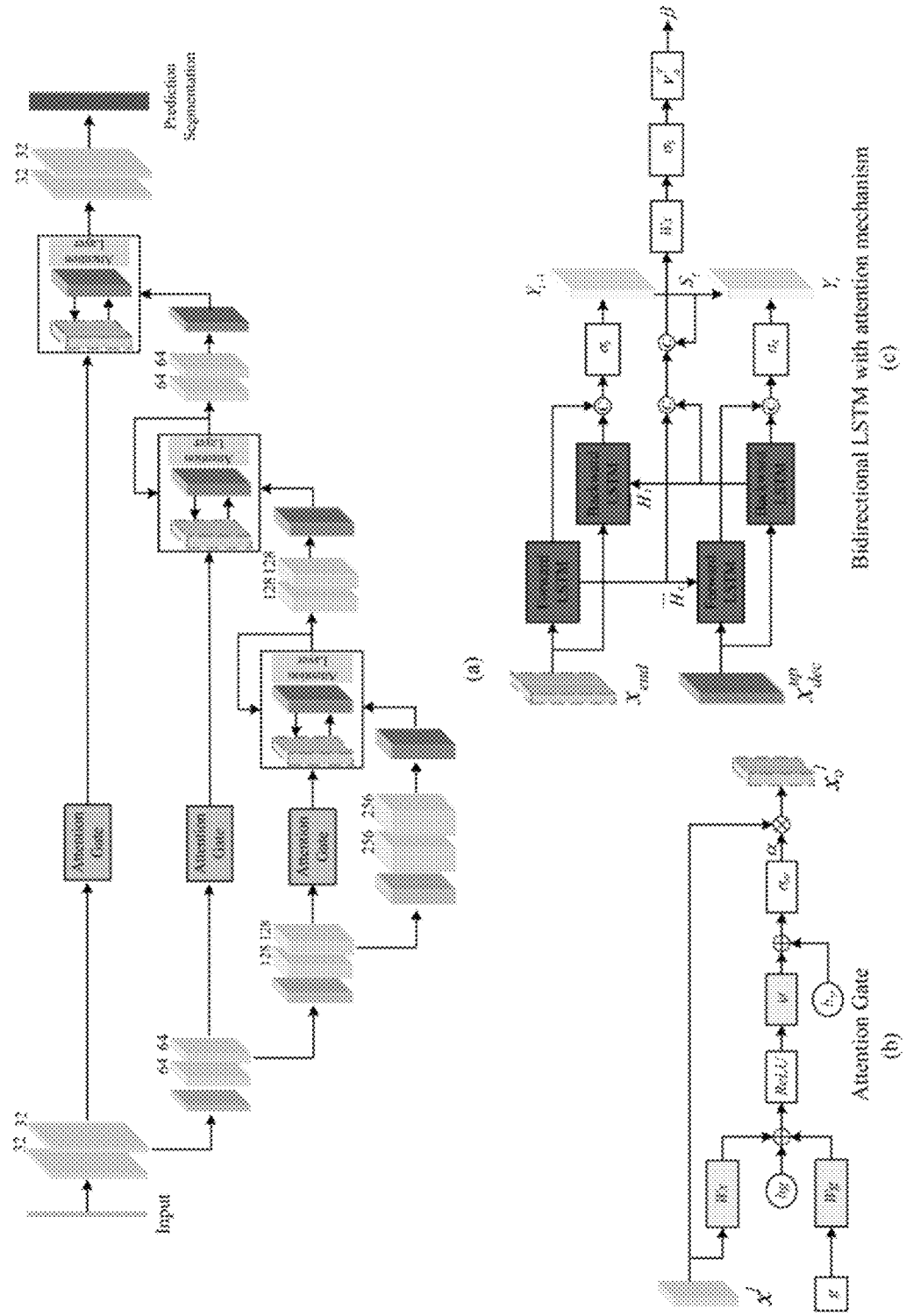
FIG. 1 depicts an overview architecture of the proposed DA-BDLSTM-DenseUNet in accordance with one embodiment.

Referring to FIG. 1, the proposed model DA-BDLSTM-DenseUNet for liver lesion segmentation task of CT image in detail is shown. The overall framework of the proposed DA-BDLSTM-DenseUNet includes four components: a DenseUNet with densely connected convolutional networks as the backbone, BDLSTM and dual-attention modules.

DenseUNet

Inspired by the success of UNet and densely-connected convolutional network (DenseNet), DenseUNet is proposed by changing the backbone from fully convolutional network to DenseNet. Thus, DenseUNet enjoys the following advantages: 1) it encourages the network to learn enough diverse feature candidates rather than redundant ones; 2) it enhances the learning capability of the network through effectively allowing the information flow and reusing features; and 3) it reduces the risk of gradient exploding or vanishing, and the gradients are quickly sent to their respective expected locations in the backward propagation path.

BD-LSTM

Bi-Directional Long Short Term Memory (BD-LSTM) has been widely used to learn the temporal relationship of data in natural language processing. In the approach, we shall explore correlations between the encoded features in the encoder and the corresponding upsampled features in the decoder in two directions. Basically, a BD-LSTM unit is composed of three gates and a cell. These three gates are an input gate, a forget gate and an output gate respectively, and are responsible to control the amount of information into and out of the cell. The cell aims to remember values over temporal dimension. BD-LSTM can be formulated as follows:

$$i_t = \sigma_g(W_i x_t + U_i h_{t-1} + b_i) \quad (1)$$

$$f_t = \sigma_g(W_f x_t + U_f h_{t-1} + b_f) \quad (2)$$

$$o_t = \sigma_g(W_o x_t + U_o h_{t-1} + b_o) \quad (3)$$

$$c_t = f_t \circ c_{t-1} + i_t \circ \sigma_c(W_c x_t + U_c h_{t-1} + b_c) \quad (4)$$

$$h_t = o_t \circ \sigma_h(c_t) \quad (5)$$

where $\circ$ is the elementwise product. t denotes the $t^{th}$ time stamp. $\sigma_g$ and $\sigma_c$ are the sigmoid and hyperbolic tangent functions, respectively. $\sigma_h(x) = x$. The output of BD-LSTM by considering the forward and backward hidden states can be defined by:

$$Y_t = \sigma_g(W_y^{\vec{H}} \vec{H}_t + W_y^{\overleftarrow{H}} \overleftarrow{H}_t + b_y) \quad (6).$$

Dual-Attention Mechanism

There are two kinds of attention mechanisms in our method, working in DenseUNet and BD-LSTM module, respectively. Specifically, in standard CNNs like the encoder of DenseUNet, the receptive field becomes larger for capturing the contextual information when the depth of convolution layers increases. In other words, features learnt by convolution kernels construct relationships between objects in a coarser grid level. However, it is still challenging to avoid the risk of false-positive predictions for small objects with larger shape variability. Existing segmentation approaches introduce an auxiliary object localization sub-network to address this issue, which results in a large amount of network parameters. Practically, the object localization subnetwork can be replaced by the attention gates (AGs) capable of pruning responses of unrelated contextual regions and identifying related salient regions layer by layer. For each pixel vector x1 RFl where Fl denotes the number of convolution kernels in the lth layer, the output of AGs is the element-wise product of feature responses and the corresponding attention activation responses, which is defined by:

$$\hat{x}_i^l = x_i^l \alpha_i^l, \quad (7)$$

where $$\alpha_i^l = \sigma_{att}(q_{att}^l(x_i^l, g_i; \theta_{att})), \quad (8)$$

$$q_{att}^i = \Psi^T(\sigma_1(W_x^T x_i^l + W_g^T g_i + b_g)) + b_\Psi, \quad (9)$$

where $\sigma_1$ and $\sigma_{att}$ are the ReLU and sigmoid function. AGs are parameterized by $\theta_{att}$ including $W_x \in R^{F_l \times F_a}$, $W_g \in R^{F_g \times F_a}$, $\Psi \in R^{F_a \times 1}$, $b_\Psi$, $\in R$ and $b_g \in R^{F_a}$.

Another attention mechanism is introduced in the BD-LSTM for neural machine translation. This attention pays different attention to parts of the encoded input information. Similarly, we explore differences of contributions that the en coded features and upsampled features make to the segmentation. This attention can be formulated by:

$$\beta_{i,t} = \frac{\exp(v_a^T \sigma_g(W_a[s_t, H_i]))}{\sum_{j=1}^n \exp(v_a^T \sigma_g(W[s_t, H_j]))}, \quad (10)$$

where $v_a$ and $W_a$ denote the transformation matrices, respectively. $\beta_{i,t}$ reflects the importance of each hidden state of input $x_i$ to the corresponding output.

Examples

Unless otherwise indicated in the examples and elsewhere in the specification and claims, all parts and percentages are by weight, all temperatures are in degrees Centigrade, and pressure is at or near atmospheric pressure.

In this section, the effectiveness of the proposed methods are evaluated by conducting experiments on two liver CT image data sets, among which one is a public data set LiTS and the other one is collected from a hospital in Hong Kong. A dice coefficient (DC) is adopted to measure the quality of segmentation, which is defined as follows:

$$DC(Y, Y') = \frac{2|Y \cap Y'|}{|Y| + |Y'|}, \quad (11)$$

where Y and Y' denote the ground-truth and the predicted labels for all the pixels in a given CT image, respectively.

Data Description

The first data set is LiTS, which includes 100 and 31 contrast-enhanced abdominal CT images as the training set and the testing set, respectively. The slice cutting-distance of LiTS varies between 0.46 mm and 6.0 mm. The data used in this study were collected from a local hospital in Hong Kong, which contains 1/1.25/1.5-mm thin-sliced abdominal CT images of 571 patients. Among them, 72 patients were diagnosed with HCC and 499 patients had other non-CC lesion or no lesions. CT images of each patient covered 4 phases, namely noncontrast, late-arterial, portal venous and delayed. The size of both the above two CT image data sets is 512 512, while the slice number of each patient in each phase can vary, as summarized in Table 1 and FIG. 2.

TABLE 1

| Phase | Number of slices (Range) |
|---|---|
| 1 (Non-contrast) | 145,715 |
| 2 (Later-Arterial) | 147,401 |
| 3 (Portal Venous) | 145,784 |
| 4 (Delayed) | 148,784 |

Quantitative Evaluation

In this part, the comparative results of the method DA-BDLSTM DenseUNet described herein against state-of-the-art segmentation models are illustrated in Table 2. These counterparts include UNet [4], ResUNet [5], DenUNet [6]. Besides, BDLSTM is integrated into these models to obtain BDLSTM-UNet, BDLSTM-ResUNet and BDLSTM-DenseUNet, respectively. The reported best liver lesion segmentation result [7] has reached 0.8570, which is evaluated on the LITS data set. From Table 2, it is observed ResUNet and DenUNet can achieve better segmentations than UNet does. The reason is that ResUNet adopts skip connections to regulate the identity information flow, which allows a deeper network capable of enhancing the representative power. Similarly, DenUNet improves the capability of network by densely connecting the preceding layers to all the succeeding layers. Meanwhile, the combined version of BDLSTM and UNet achieves a better segmentation performance than UNet by about 1.2%. Similar observations are observed by comparing ResUNet and BDLSTM-ResUNet, DenUNet and BDLSTM-DenUNet, respectively. It indicates that BDLSTM can help to improve segmentation performance by exploring relationships between the encoded features and the upsampled features. Our DA-BDLSTM-DenseUNet achieves a better result than BDLSTM-DenUNet by about 0.85%, due to two attention mechanisms introduced in the DenseUNet and BDLSTM. The attention gate in the DenseUNet allows focusing on pixelwise responses of salient regions of lesion candidates, and the attention in BDLSTM considers contribution differences between the encoded features and the upsampled features to assign proper weights before conducting feature concatenation. As a result, DA-BDLSTM-DenseUNet delivers the best performance among the comparative methods.

TABLE 2

| Model | LITS | PYN |
|---|---|---|
| UNet | 0.7747 | 0.7846 |
| ResUNet | 0.7958 | 0.8142 |
| DenseUNet | 0.8005 | 0.7989 |
| BDLSTM-UNet | 0.8128 | 0.8066 |
| BDLSTM-ResUNet | 0.8242 | 0.8290 |
| BDLSTM-DenseUNet | 0.8369 | 0.8435 |
| DA-BDLSTM-DenseUNet | 0.8547 | 0.8520 |

In addition, we explore contributions of both the attention mechanisms in our method to the segmentation performance by conducting ablation study. Specifically, we remove the attention gate in the DenseUNet and the attention mechanism in the BDLSTM and denote them by BDLSTM-DenseUNet-V1 and BDLSTM-DenseUNet-V2, respectively.

The comparative results are shown in Table 3. Compared with BDLSTM-DenseUNet, we observe the attentions in the DenseUNet and BDLSTM enhance the performance by 0.47% and 0.63%, respectively. It indicates the effectiveness of the attention mechanisms. The attention in DenseUNet makes a larger contribution to performance improvement than the attention in BDLSTM, since the latter works on the foundation of the former which can accentuate the salient responses and depress irrelevant response. Besides, the combination of these two attentions delivers a better segmentation.

TABLE 3

| Model | LITS | PYN |
| --- | --- | --- |
| BDLSTM-DenseUNet | 0.8369 | 0.8435 |
| BDLSTM-DenseUNet-V1 | 0.8436 | 0.8482 |
| BDLSTM-DenseUNet-V2 | 0.8472 | 0.8498 |
| DA-BDLSTM-DenseUNet | 0.8547 | 0.8574 |

Qualitative Evaluation

Figure 3:
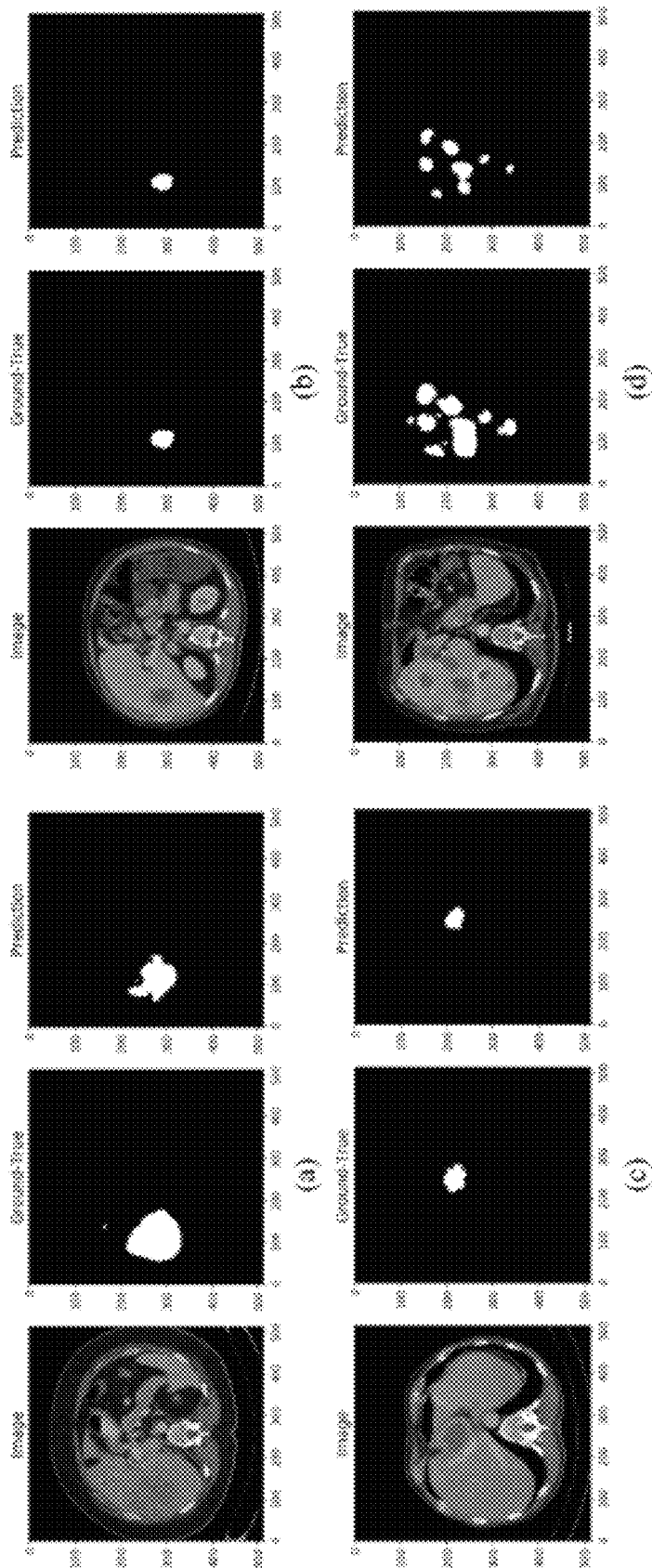

In this part, the segmentation results obtained by our method together with the original CT image slices and the corresponding ground-truth are demonstrated in FIG. 3. From this figure, it is noticed that the methods described herein can identify the lesion position, achieving a satisfactory segmentation performance in the easy CT image slices. Concerning difficult slices where there are three or more than lesions with different sizes like FIG. 3(d), although the method described herein is able to localize the majority of lesions, the segmentation areas are smaller than those of the ground-truth ones.

SUMMARY

The proposed new network scheme for automatic liver lesion segmentation is termed as DA-BDLSTN-DenseUNet. First, densely connected convolutional networks are adopted as the backbones of UNet. Second, bidirectional long short term memory (BD-LSTM) are introduced to explore the correlations between the encoded features in the encoding path and the upsampled features in the decoding path. Third, attention mechanisms are fused into convolutions and BD-LSTM. Experiments are conducted on liver CT images collected from several hospitals. Experimental results verify the effectiveness of the method described herein in terms of dice coefficient.

Moreover, the feasibility of utilizing generative adversarial networks to synthesize diverse enough liver images can be explored. First, images can be generated with a specific kind of lesion by using CGAN, which mitigates the issues of data scarcity and class imbalance. Thus, it can improve performance of lesion classification. Second, all the CT images and corresponding segmentation from one hospital and partial CT images and corresponding segmentations together with unlabeled CT images from another hospital can be utilized to construct a semi-supervised segmentation scheme via domain adaptation, where GAN learns the distribution of lesion and generate images given the manual annotation of lesion. Besides, the designed classification and segmentation models trained on CT images can be transplanted to MR images by using the thought of domain adaptation and multimodal learning, since it is considered easily the CT and MR images as the source and the target domains or two related but different modal data. In addition, it is possible to explore lesion segmentations over multiple organs simultaneously, such as the joint analysis of the liver and lung.

Example Computing Environment

As mentioned, advantageously, the techniques described herein can be applied to any device and/or network where analysis of data is performed. The below general purpose remote computer described below in FIG. 4 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 4 thus illustrates an example of a suitable computing system environment 1100 in which some aspects of the disclosed subject matter can be implemented, although as made clear above, the computing system environment 1100 is only one example of a suitable computing environment for a device and is not intended to suggest any limitation as to the scope of use or functionality of the disclosed subject matter. Neither should the computing environment 1100 be interpreted as having any dependency or requirement relating to any one or combination of components illustrated in the exemplary operating environment 1100.

With reference to FIG. 4, an exemplary device for implementing the disclosed subject matter includes a general-purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures.

Computer 1110 typically includes a variety of computer readable media. Computer readable media can be any available media that can be accessed by computer 1110. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules, or other data in a modulated data signal such as a carrier wave or other transport mechanism and includes any information delivery media.

The system memory 1130 may include computer storage media in the form of volatile and/or nonvolatile memory such as read only memory (ROM) and/or random access memory (RAM). A basic input/output system (BIOS), containing the basic routines that help to transfer information between elements within computer 1110, such as during start up, may be stored in memory 1130. Memory 1130 typically also contains data and/or program modules that are immediately accessible to and/or presently being operated on by processing unit 1120. By way of example, and not limitation, memory 1130 may also include an operating system, application programs, other program modules, and program data.

The computer 1110 may also include other removable/non-removable, volatile/nonvolatile computer storage media. For example, computer 1110 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1121 through a non-removable memory interface such as an interface, and a magnetic disk drive or optical disk drive is typically connected to the system bus 1121 by a removable memory interface, such as an interface.

A user can enter commands and information into the computer 1110 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1120 through user input 1140 and associated interface(s) that are coupled to the system bus 1121, but may be connected by other interface and bus structures, such as a parallel port, game port, or a universal serial bus (USB). A graphics subsystem can also be connected to the system bus 1121. A projection unit in a projection display device, or a HUD in a viewing device or other type of display device can also be connected to the system bus 1121 via an interface, such as output interface 1150, which may in turn communicate with video memory. In addition to a monitor, computers can also include other peripheral output devices such as speakers which can be connected through output interface 1150.

The computer 1110 can operate in a networked or distributed environment using logical connections to one or more other remote computer(s), such as remote computer 1170, which can in turn have media capabilities different from device 1110. The remote computer 1170 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1110. The logical connections depicted in FIG. 4 include a network 1171, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1110 can be connected to the LAN 1171 through a network interface or adapter. When used in a WAN networking environment, the computer 1110 can typically include a communications component, such as a modem, or other means for establishing communications over the WAN, such as the Internet. A communications component, such as wireless communications component, a modem and so on, which can be internal or external, can be connected to the system bus 1121 via the user input interface of input 1140, or other appropriate mechanism. In a networked environment, program modules depicted relative to the computer 1110, or portions thereof, can be stored in a remote memory storage device. It will be appreciated that the network connections shown and described are exemplary and other means of establishing a communications link between the computers can be used.

Example Networking Environment

FIG. 5 provides a schematic diagram of an exemplary networked or distributed computing environment 1200. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1240 can include one or more cache memories, one or more registers, or other similar data stores disclosed herein.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 5, communications network 1242 may comprise other computing objects and computing devices that provide services to the system of FIG. 5, and/or may represent multiple interconnected networks, which are not shown. Each computing object 1210, 1212, etc. or computing object or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Reference throughout this specification to "one embodiment," "an embodiment," "an example," "an implementation," "a disclosed aspect," or "an aspect" means that a particular feature, structure, or characteristic described in connection with the embodiment, implementation, or aspect is included in at least one embodiment, implementation, or aspect of the present disclosure. Thus, the appearances of the phrase "in one embodiment," "in one example," "in one aspect," "in an implementation," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

Notes, which are incorporated herein by reference:

[6] X. Li., H. Chen, X. Qi, Q. Dou, C. W. Fu, P. A. Heng: H-DenseUNet: hybrid densely connected UNet for liver and tumor segmentation from CT volumes. IEEE Transactions on Medical Imaging, 37 (12), pp. 26632674, 2016.

[7] C. Sun, S. Guo, H. Zhang, J. Li, M. Chen, S. Ma, L. Jin, X. Liu, X. Li and X. Qian: Automatic segmentation of liver tumors from multiphase contrast-enhanced CT images based on FCNs, Artificial Intelligence in Medicine, 83, pp. 58-66, 2017.

[8] F. Ouhmich, V. Agnus, V. Noblet, F. Heitz, P. Pessaux: Liver tissue segmentation in multi-phase CT scans using cascaded convolutional neural networks. International Journal of Computer Assisted Radiology and Surgery, 14, pp. 1275-1284, 2019.

[9] S. Lee, J. S. Bae, H. Kim, J. H. Kim, S. Yoon: Liver lesion detection from weakly-labeled multi-phase CT volumes with a grouped single shot multi-box detector, MICCAI, 2018.

[11] D. Liang, L. Lin, H. Hu, Q. Zhang, Q. Chen, X. Han, Y. Chen: Combining convolutional and recurrent neural networks for classification of focal liver lesions in multi phase CT images. In international conference on medical image computing and computer-assisted intervention, pp. 666-675, Springer, Cham, 2018.

[11] C. Dong, Y. Chen, L. Lin, H. Hu, C. Jin, H. Yu, X. Han, T. Tomoko: Simultaneous segmentation of multiple organs using random walks. In journal of information processing, 24(2), pp. 320-329, 2016.

[13] C. Dong, Y. Chen, A. Foruzan, L. Lin, X. Han, T. Tomoko, X. Wu, X. Gang, H. Jiang: Segmentation of liver and spleen based on computational anatomy models. In computers in biology and medicine, 67, pp. 146160, 2015.

[14] W. Liu, D. Anguelov, D. Erhan, C. Szegedy, S. Reed, C. Y. Fu, A. C. Berg: Ssd: Single shot multibox detector. In European conference on computer vision, pp. 21-37. Springer, Cham, 2016.

What is claimed is:

1. A liver cancer analysis system, comprising:
a memory that stores computer executable components; and
a processor that executes the computer executable components stored in the memory, wherein the computer executable components comprise:
a learning component that learns a plurality of diverse features of a liver sample for uploading and calculates relationships between encoded features and upsampled features in encoding and decoding paths;
a response filter component that diminishes responses of unrelated background regions and magnify responses of salient regions progressively; and
a weighting component that determines relative contributions of the encoded features and the upsampled features.

2. The system of claim 1, wherein the learning component comprises a DenseUNet unit that learns a plurality of diverse features of the liver sample for uploading.

3. The system of claim 1, wherein the learning component comprises a bidirectional long short term memory (BD-LSTM) unit that calculates relationships between encoded features and upsampled features in encoding and decoding paths.

4. The system of claim 3, wherein the BD-LSTM unit comprises an input gate, a forget gate and an output gate, and a cell, wherein the input gate, forget gate and output gate are used to control the amount of information into and out of the cell, and the cell is used to remember values over temporal dimension.

5. The system of claim 3, wherein the BD-LSTM unit is formulated as follows:

$$i_t = \sigma_g(W_i x_t + U_i h_{t-1} + b_i) \tag{1}$$

$$f_t = \sigma_g(W_f x_t + U_f h_{t-1} + b_f) \tag{2}$$

$$o_t = \sigma_g(W_o x_t + U_o h_{t-1} + b_o) \tag{3}$$

$$c_t = f_t \circ c_{t-1} + i_t \circ \sigma_c(W_c x_t + U_c h_{t-1} + b_c) \tag{4}$$

$$h_t = o_t \circ \sigma_h(c_t) \tag{5}$$

wherein ° is an elementwise product, t denotes a $t^{th}$ time stamp, $\sigma_g$ and $\sigma_c$ are sigmoid and hyperbolic tangent functions, respectively, and $\sigma_h(x)=x$.

6. The system of claim 3, wherein the output of BD-LSTM by considering forward and backward hidden states is defined by:

$$Y_t = \sigma_g(W_{\vec{y}}^{\vec{H}} \vec{H}_t + W_{\cev{y}}^{\cev{H}} \cev{H}_t + b_y) \tag{6}$$

7. The system of claim 1, wherein the response filter component is defined by:

$$\hat{x}_i^l = x_i^l \alpha_i^l \tag{7}$$

wherein $$\alpha_i^l = \sigma_{att}(q_{att}^l(x_i^l, g_i; \theta_{att})), \tag{8}$$

$$q_{att}^l = \Psi^T(\sigma_1(W_x^T x_i^l + W_g^T g_i + b_g)) + b_\psi, \tag{9}$$

wherein $\sigma_1$ and $\sigma_{att}$ are ReLU and sigmoid function, and $W_x \in R^{F_i \times F_a}$, $W_g \in R^{F_g \times F_a}$, $\Psi \in R^{F_a \times 1}$, $b_\psi \in R$ and $b_g \in R^{F_a}$.

8. The system of claim 1, wherein the weighting component is formulated by:

$$\beta_{i,t} = \frac{\exp(v_a^T \sigma_g(W_a[s_t, H_i]))}{\sum_{j=1}^{n} \exp(v_a^T \sigma_g(W[s_t, H_j]))}, \tag{10}$$

wherein $v_a$ and $W_a$ denote transformation matrices, respectively, and $\beta_{i,t}$ reflects the importance of each hidden state of input $x_i$ to corresponding output.

9. A method of detecting or characterizing liver cancer, comprising:
a) learning a plurality of diverse features of a liver sample for uploading and calculating relationships between encoded features and upsampled features in encoding and decoding paths;
b) diminishing responses of unrelated background regions and magnifying responses of salient regions progressively;
c) determining relative contributions of the encoded features and the upsampled features; and
d) detecting or characterizing liver cancer from the liver sample.

10. The method of claim 9, wherein the learning in step a) is performed by a DenseUNet unit.

11. The method of claim 9, wherein the calculation in step a) is performed by a bidirectional long short term memory (BD-LSTM) unit.

12. The method of claim 11, wherein the BD-LSTM unit comprises an input gate, a forget gate and an output gate, and a cell, wherein the input gate, forget gate and output gate are used to control the amount of information into and out of the cell, and the cell is used to remember values over temporal dimension.

13. The method of claim 11, wherein the BD-LSTM unit is formulated as follows:

$$i_t = \sigma_g(W_i x_t + U_i h_{t-1} + b_i) \quad (1)$$

$$f_t = \sigma_g(W_f x_t + U_f h_{t-1} + b_f) \quad (2)$$

$$o_t = \sigma_g(W_o x_t + U_o h_{t-1} + b_o) \quad (3)$$

$$c_t = f_t \circ c_{t-1} + i_t \circ \sigma_c(W_c x_t + U_c h_{t-1} + b_c) \quad (4)$$

$$h_t = o_t \circ \sigma_h(c_t) \quad (5)$$

wherein ∘ is an elementwise product, t denotes a $t^{th}$ time stamp, $\sigma_g$ and $\sigma_c$ are sigmoid and hyperbolic tangent functions, respectively, and $\sigma_h(x)=x$.

14. The method of claim 11, wherein the output of BD-LSTM by considering forward and backward hidden states is defined by:

$$Y_t = \sigma_g(W_y^{\vec{H}} \vec{H}_t + W_y^{\overleftarrow{H}} \overleftarrow{H}_t + b_y) \quad (6).$$

15. The method of claim 9, wherein step b) is performed by a response filter component that is defined by:

$$\hat{x}_i^l = x_i^l \alpha_i^l, \quad (7)$$

where $$\alpha_i^l = \sigma_{att}(q_{att}^l(x_i^l, g_i, \theta_{att})), \quad (8)$$

$$q_{att}^i = \Psi^T(\sigma_1(W_x^T x_i^l + W_g^T g_i + b_g)) + b_\Psi, \quad (9)$$

wherein $\sigma_1$ and $\sigma_{att}$ are ReLU and sigmoid function, and $W_x \in R^{F_l \times F_a}$, $W_g \in R^{F_g \times F_a}$, $\Psi \in R^{F_a \times 1}$, $b_\Psi \in R$ and $b_g \in R^{F_a}$.

16. The method of claim 9, wherein step c) is performed by a weighting component that is formulated by:

$$\beta_{i,t} = \frac{\exp(v_a^T \sigma_g(W_a[s_t, H_i]))}{\sum_{j=1}^n \exp(v_a^T \sigma_g(W[s_t, H_j]))}, \quad (10)$$

wherein $v_a$ and $W_a$ denote transformation matrices, respectively, and $\beta_{i,t}$ reflects the importance of each hidden state of input $x_i$ to corresponding output.

17. A non-transitory machine-readable storage medium, comprising executable instructions that, when executed by a processor, facilitate performance of operations, comprising:
a) learning a plurality of diverse features of a liver sample for uploading and calculating relationships between encoded features and upsampled features in encoding and decoding paths;
b) diminishing responses of unrelated background regions and magnifying responses of salient regions progressively;
c) determining relative contributions of the encoded features and the upsampled features; and
d) detecting or characterizing liver cancer from the liver sample.

18. The non-transitory machine-readable storage medium of claim 17, wherein the learning in step a) is performed by a DenseUNet unit.

19. The non-transitory machine-readable storage medium of claim 17, wherein the calculation in step a) is performed by a bidirectional long short term memory (BD-LSTM) unit.

20. The non-transitory machine-readable storage medium of claim 19, wherein the BD-LSTM unit comprises an input gate, a forget gate and an output gate, and a cell, wherein the input gate, forget gate and output gate are used to control the amount of information into and out of the cell, and the cell is used to remember values over temporal dimension.

21. The non-transitory machine-readable storage medium of claim 19, wherein the BD-LSTM unit is formulated as follows:

$$i_t = \sigma_g(W_i x_t + U_i h_{t-1} + b_i) \quad (1)$$

$$f_t = \sigma_g(W_f x_t + U_f h_{t-1} + b_f) \quad (2)$$

$$o_t = \sigma_g(W_o x_t + U_o h_{t-1} + b_o) \quad (3)$$

$$c_t = f_t \circ c_{t-1} + i_t \circ \sigma_c(W_c x_t + U_c h_{t-1} + b_c) \quad (4)$$

$$h_t = o_t \circ \sigma_h(c_t) \quad (5)$$

wherein ∘ is an elementwise product, t denotes a $t^{th}$ time stamp, $\sigma_g$ and $\sigma_c$ are sigmoid and hyperbolic tangent functions, respectively, and $\sigma_h(x)=x$.

22. The non-transitory machine-readable storage medium of claim 19, wherein the output of BD-LSTM by considering forward and backward hidden states is defined by:

$$Y_t = \sigma_g(W_y^{\vec{H}} \vec{H}_t + W_y^{\overleftarrow{H}} \overleftarrow{H}_t + b_y) \quad (6).$$

23. The non-transitory machine-readable storage medium of claim 17,
wherein step b) is performed by a response filter component that is defined by:

$$\hat{x}_i^l = x_i^l \alpha_i^l, \quad (7)$$

where $$\alpha_i^l = \sigma_{att}(q_{att}^l(x_i^l, g_i, \theta_{att})), \quad (8)$$

$$q_{att}^i = \Psi^T(\sigma_1(W_x^T x_i^l + W_g^T g_i + b_g)) + b_\Psi, \quad (9)$$

wherein $\sigma_1$ and $\sigma_{att}$ are ReLU and sigmoid function, and $W_x \in R^{F_l \times F_a}$, $W_g \in R^{F_g \times F_a}$, $\Psi \in R^{F_a \times 1}$, $b_\Psi \in R$ and $b_g \in R^{F_a}$.

24. The non-transitory machine-readable storage medium of claim 17, wherein step c) is performed by a weighting component that is formulated by:

$$\beta_{i,t} = \frac{\exp(v_a^T \sigma_g(W_a[s_t, H_i]))}{\sum_{j=1}^n \exp(v_a^T \sigma_g(W[s_t, H_j]))}, \quad (10)$$

wherein $v_a$ and $W_a$ denote transformation matrices, respectively, and $\beta_{i,t}$ reflects the importance of each hidden state of input $x_i$ to corresponding output.

* * * * *